Figure 1:
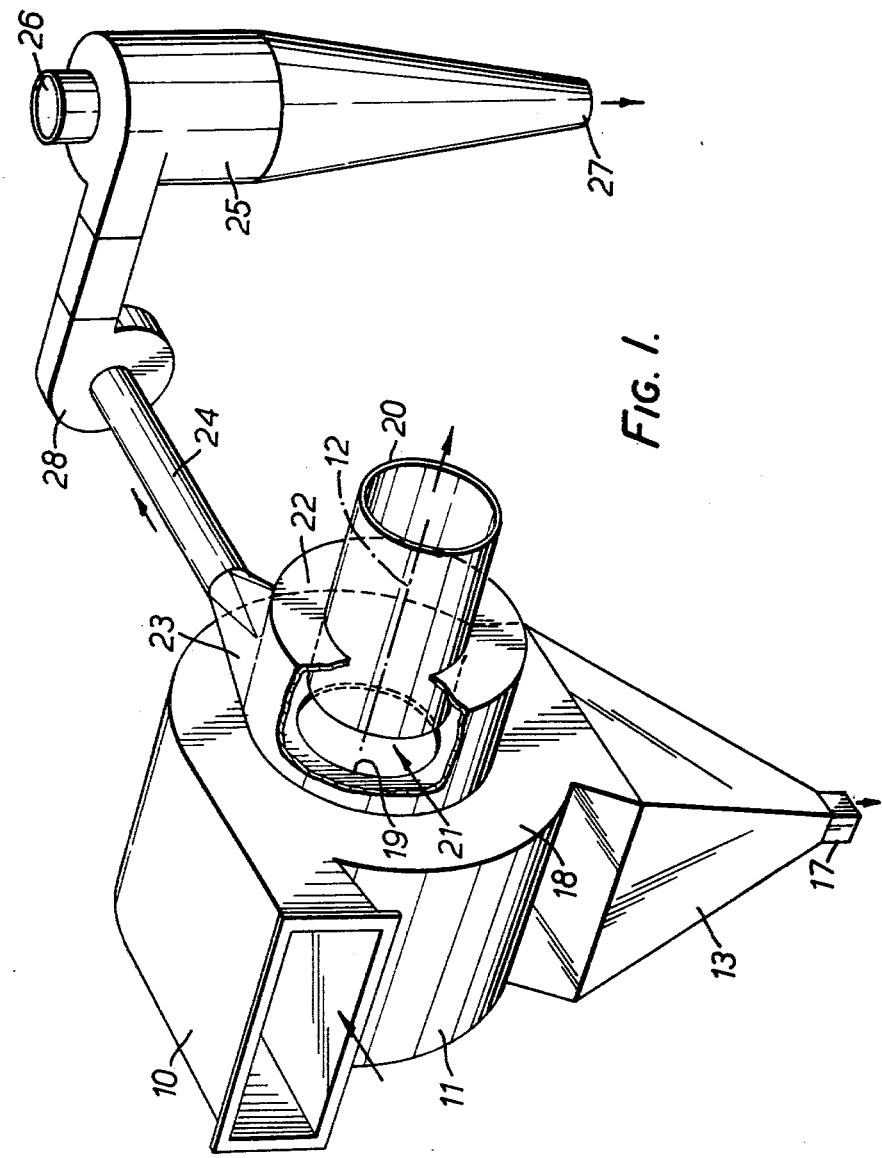

United States Patent [19]

Summers

[11] 4,198,290
[45] Apr. 15, 1980

[54] DUST SEPARATING EQUIPMENT

[76] Inventor: Daniel Summers, "Sunnybank", Leckhampton Hill, Cheltenham, Gloucestershire, England

[21] Appl. No.: 895,583

[22] Filed: Apr. 11, 1978

[30] Foreign Application Priority Data

Apr. 14, 1977 [GB] United Kingdom ............... 15597/77

[51] Int. Cl.² .......................... B04C 3/04; B01D 45/12
[52] U.S. Cl. ..................... 209/144; 55/345; 55/459 R
[58] Field of Search ................ 209/133, 211, 143–145, 209/149; 55/339, 345, 459 R

[56] References Cited

U.S. PATENT DOCUMENTS

| 1,845,358 | 2/1932 | Stebbins | 209/144 |
| 3,017,993 | 1/1962 | MacPherson et al. | 209/144 |
| 3,116,238 | 12/1963 | Van Etten | 55/459 R |
| 3,504,804 | 4/1970 | Newman et al. | 209/211 |
| 3,535,854 | 10/1970 | Taylor | 55/459 R |
| 4,019,883 | 4/1977 | Klomp | 209/144 |

FOREIGN PATENT DOCUMENTS 440163  6/1975  U.S.S.R. .................................. 209/147

Primary Examiner—Frank W. Lutter
Assistant Examiner—Jon E. Hokanson
Attorney, Agent, or Firm—Young & Thompson

[57] ABSTRACT

A cyclone separator for separating fine particles or dust from a gas stream comprising a main separator chamber 11 having a tangential gas inlet 10 to form a circulating gas vortex about an axis 12, and a gas outlet opening 19 aligned with the vortex axis at one end of the chamber and communicating with a main gas outlet duct 20. Within the main separator chamber 11 there are positioned baffles or vanes 14,15 which separate off the heavier solid particles into a hopper 13 below the chamber. Adjacent the outlet aperture 19 is an annular opening 21 which communicates with a subsidiary casing 22 having a tangential outlet 23. Fine particles are therefore flung outwards by centrifugal force into the casing 22 and are then separated in a further cyclone separator 25.

6 Claims, 3 Drawing Figures

DUST SEPARATING EQUIPMENT

This invention relates to apparatus for separating fine particles from gases, and may be applied both to air or gas cleaning equipment and to equipment for separating and recovering valuable dust or other solid particles.

One existing method of separating solid dust particles is to pass a dust laden air stream into a pre-cleaner chamber through a tangential inlet so that the air and particles rotate at high velocity about a central rotary axis, the heavier particles therefore moving under centrifugal force towards the periphery wall of the chamber and being separated from the air by one or more generally tangential internal separator plates or vanes. The separated particles then fall into a dust hopper which is built into the casing of the chamber and the dust can be removed from this hopper through the usual rotary or automatic dump valves.

In such apparatus relatively clean air from the pre-cleaner is removed through an exit opening provided on the rotary axis in one end wall. This opening is connected directly to an axially aligned exit or discharge pipe leading to an extractor fan from which the air then passes to a final cleaner which may consist of a wet scrubber or a fabric filter for example.

In such equipment it is found that the very high velocity of the fine particles leaving the pre-cleaner causes rapid wear of the exit pipe. It is also necessary in many cases to pass pre-cleaned air through expensive multi-stage dust separators before they pass to the final wet scrubber.

Accordingly it is an object of the present invention to provide an improved pre-cleaning device, and broadly stated the invention consists in apparatus for separating fine particles from a gas stream, comprising a main separator chamber with a generally tangential gas inlet arranged to form a circulating vortex and means for separating and removing heavy particles therefrom, and an outlet opening aligned with the vortex axis of the main chamber and communicating with a main axial gas outlet duct, and a subsidiary peripheral extraction aperture or chamber for removing fine particles emerging from the outlet opening.

Preferably the subsidiary aperture or chamber is connected to a secondary extractor fan, and it may also be connected to a further dust cleaner or separator, which is conveniently positioned upstream of the said secondary fan.

In a preferred construction the main chamber has a dust extraction opening at its lower end, and the vortex axis of the chamber is horizontal. The main chamber includes one or more internal deflector blades, plates, vanes or gates, for separating off heavier particles adjacent the periphery of the chamber, and the outlet opening from the main chamber is in the form of an opening in a substantially flat side wall, and there is no internal projecting exit pipe.

From another aspect the invention provides apparatus for separating fine particles from a gas stream, comprising a first chamber having a tangential inlet arranged to cause circulation of the gas within the chamber, at least one plate, vane, gate or opening in the peripheral wall of the chamber arranged to allow particles to be impelled therethrough as a result of the circulating movement, a lateral opening in the centre of a side wall of the chamber leading to a discharge duct, and a further vane or opening on the downstream side of the exit opening to receive circulating particles before they enter the discharge duct.

Figure 2:
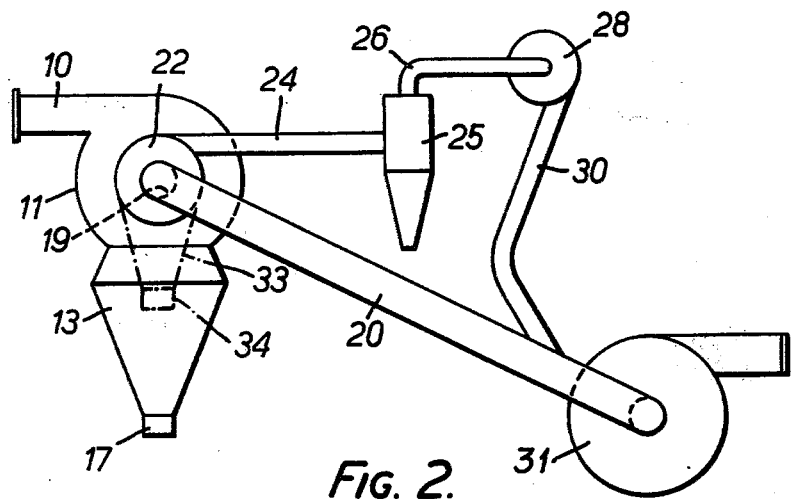
Figure 3:
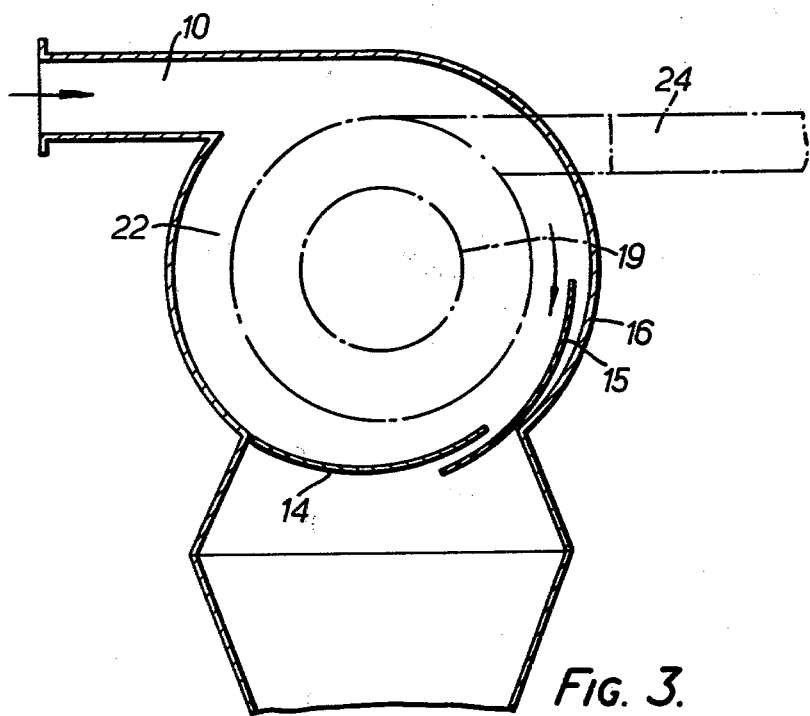

The invention may be performed in various ways and one specific embodiment will now be described by way of example, with reference to the accompanying drawings in which:

FIG. 1 is a diagrammatic perspective view of a dust pre-cleaner according to the invention, FIG. 2 is a diagram illustrating the installation of such a device, incorporating a modification, and FIG. 3 is a vertical section through the pre-cleaning chamber of FIG. 1.

In the example illustrated the dust laden air containing both fine and heavy particles enters the pre-cleaner through a tangential inlet 10 at a velocity for example of about 3,000 to 4,000 ft. per minute. The pre-cleaner chamber 11 is generally cylindrical in shape with its vortex axis 12 lying horizontal, and the wall of the chamber is formed continuous with a dust hopper 13 below. Mounted within the chamber are a pair of dust separator vanes 14,15 (see FIG. 3) which extend circumferentially and are inset inwards from the chamber wall so as to separate off the moving heavy particles which tend to be thrown out by centrifugal force against the cylindrical back wall 16 of the chamber. These heavy dust particles then fall by gravity into the hopper 13 from which they can be extracted at intervals by the usual automatic rotary suction valve at 17.

The pre-cleaner chamber 11 has two flat parallel side walls and in one of these 18 is formed a central circular aperture 19 acting as an air outlet opening. This communicates with an aligned cylindrical discharge duct 20 which leads to an extractor fan 31 (see FIG. 2) and thence to the final cleaner equipment (not shown) which may consist of or include a wet scrubber or a fabric filter. (In some cases the air may be discharged direct to the atmosphere).

Between the opening 19 and the end of the tube 20 is an annular gap indicated at 21 and around this gap is provided a subsidiary casing 22 leading to a tangential outlet 23 communicating via a duct 24 with a small vortex cyclone separator 25 having a clean air discharge 26 at its upper end and a fine dust removal opening 27 at its lower end. A secondary extractor fan 28 may be fitted either upstream of the cyclone 25 as illustrated in FIG. 1, or downstream of the clean air outlet as illustrated in FIG. 2 so that the fan will not be exposed to abrasion by the fine particles.

In operation the bulk of the heavy particles are removed from the gas stream by the pre-cleaner 11, but at least some of the fine particles will issue from the chamber through the opening 19. The air issuing through the opening is circulating at high velocity which may be many times greater than the inlet velocity at the inlet 10. The fine particles are therefore flung outwards by centrifugal force through the gap 21 and are impelled by the circulatory movement of the air in the chamber 22 to exit through the outlet 23, after which they are finally separated in the cyclone 25.

The clean air issuing from the cyclone at 26 may be returned via a duct 30 (see FIG. 2) to the same common duct 20 from the main pre-cleaner, or alternatively this passage 26 may lead to the atmosphere or to some other point of use.

The invention has valuable advantages in that abrasion of the pipe 20 is greatly reduced and also very importantly it is possible to eliminate much of the usual existing cleaning equipment downstream of the pre-cleaner.

In a further possible modification the subsidiary casing 22 may be provided with a lower dust discharge hopper 33 with an outlet rotary suction valve 34, as indicated in broken lines in FIG. 2. In this case the extractor fan 28 and the cyclone 25 can be omitted, the fine particles being thrown out of the circulating gas in the chamber 22 by their own centrifugal momentum. This may be slightly less efficient than the combination of the cyclone 25 with the fan 28, but it will of course be more economical in cost.

I claim:

1. Apparatus for separating particles of different masses from a gas stream, comprising:
   (a) a substantially cylindrical main separation chamber (11) having a side wall and two end walls, and formed with a substantially tangential gas inlet (10) to generate a gas vortex circulating about a vortex axis (12) within said chamber;
   (b) an outlet opening (19) in an end wall (18) of said main chamber, said opening lying substantially on the vortex axis;
   (c) a main particle extraction opening (13) in the periphery of said main chamber;
   (d) at least one internal deflector member (14,15) for separating off heavier particles and directing them towards said extraction opening;
   (e) a subsidiary substantially cylindrical separation chamber (22) constructed and arranged to maintain said gas vortex and communicating with said outlet opening from said main chamber, and of smaller diameter than said main separation chamber, and having a vortex axis passing through said outlet opening;
   (f) a final gas outlet (20) communicating directly with said subsidiary chamber and spaced from said outlet opening (19) and lying substantially on the vortex axis of said subsidiary chamber; and
   (g) a subsidiary particle extraction opening (23) opening peripherally through said subsidiary chamber, for removing fine particles emerging from the main separation chamber;
   (h) said outlet opening (19) and said final gas outlet (20) both being of smaller diameter than said subsidiary chamber (22).

2. Apparatus according to claim 1 in which said final gas outlet is defined by the mouth of an outlet duct which projects into said subsidiary separation chamber and is spaced (at 21) from said outlet opening in said main chamber a distance smaller than the axial length of said subsidiary chamber.

3. Apparatus according to claim 1, in which said vortex axis of said main separation chamber is substantially horizontal.

4. Apparatus according to claim 1, in which said internal deflector member is in the form of a circumferentially extending plate (15) adjacent the wall of said main separation chamber.

5. Apparatus according to claim 1, in which said subsidiary particle extraction opening is connected to an extractor fan (28).

6. Apparatus according to claim 1, in which subsidiary particle extraction opening is connected to a further particle cleaner (25).

* * * * *